(12) United States Patent
Barakat

(10) Patent No.: US 6,763,461 B1
(45) Date of Patent: Jul. 13, 2004

(54) METHOD OF DETECTING FRAUD IN ELECTRONIC CIRCUIT CARDS USED IN TELEPHONY

(75) Inventor: Simon Barakat, Saint Germain les Arpajon (FR)

(73) Assignee: Schlumberger Systèmes, Montrouge (FR)

(*) Notice: Subject to any disclaimer, the term of this patent is extended or adjusted under 35 U.S.C. 154(b) by 0 days.

(21) Appl. No.: 09/474,443

(22) Filed: Dec. 29, 1999

(30) Foreign Application Priority Data

Dec. 30, 1998 (FR) .............................. 98 16686

(51) Int. Cl.[7] .............. H04K 1/00; H04L 9/00; G06F 17/60
(52) U.S. Cl. .............. 713/185; 388/28; 705/67; 713/194
(58) Field of Search .................. 713/185, 194; 380/23, 28; 705/67

(56) References Cited

U.S. PATENT DOCUMENTS 4,785,166 A  11/1988 Kushima
5,436,971 A  7/1995 Armbrust et al.

FOREIGN PATENT DOCUMENTS

EP  0 468 848 A1  1/1992
FR  2 554 262  3/1985

*Primary Examiner*—Gilberto Barrón
*Assistant Examiner*—Benjamin E. Lanier
(74) *Attorney, Agent, or Firm*—Cohen, Pontani, Lieberman & Pavane

(57) ABSTRACT

Detecting fraud involving use of an asynchronous circuit in the place of a card having an electronic circuit that is synchronous. A given excitation signal is applied to the electronic circuit of the card on power-up, a response pattern supplied by the circuit is recorded, the response pattern is compared with a reference pattern corresponding to the response expected from the electronic circuit to said excitation signal, and fraud conducted by means of an asynchronous circuit is identified in the event of the comparison being negative.

2 Claims, 1 Drawing Sheet

METHOD OF DETECTING FRAUD IN ELECTRONIC CIRCUIT CARDS USED IN TELEPHONY

FIELD OF THE INVENTION

The present invention relates to detecting fraud in the use of an electronic circuit card. A particularly advantageous application of the invention lies in combating fraud concerning calls made from a telephone, particularly but not exclusively a public pay phone.

BACKGROUND OF THE INVENTION

The cards used in pay phones, also known as phone cards, are generally "synchronous" electronic circuit cards which produce an output signal that is a function based on combinatory or sequential logic applied to a combination or a sequence of one or more input signals. Before becoming operational, synchronous circuits require a powering-up time of about 500 ns, for example.

The popularization of electronic circuit card technology by large circulation electronics magazines and also in technical training establishments has contributed greatly to attempts at making fraudulent use of telephones by emulating electronic circuit cards, i.e. phone cards designed to operate with such telephones. In addition, the widespread availability of sophisticated components such as programmable microprocessors, and the ease with which they can be used based on knowledge acquired in school laboratories or from programmers of microprocessors, make it likely that this type of fraud will increase.

In particular, programmed logic phone card simulators are available known as "active" simulators. These are asynchronous electronic circuit devices essentially comprising a programmable microcontroller associated with a few passive components (resistors, capacitors). By means of an internal program, the microcontroller simulates the behavior of a phone card. Components of this type are now widely available on the consumer market, as are development and programming tools therefor, in particular software that runs on personal computers.

In general, phone card fraud involves connecting the active simulator to the electrical contact zones of the electronic circuit of the phone card by means of connection wires so as to connect the simulator to the electronics of the telephone. In order to detect this type of fraud, it is possible to fit the telephone with a specific device known as an external connection detector (ECD). This detector device is mainly constituted by a large and plane electrode suitable for overlaying the connection wires connecting the simulator to the contact zones. In the absence of fraudulent connection wires, the only electrical capacitance present between the card and said electrode is a capacitance C0 due to the environment of the card and of the electronics. However, the presence of fraudulent connection wires creates a distributed capacitance C1 between the plane electrode and the contacts of the pay phone terminal. The principle on which an ECD operates is thus to detect the increase of capacitance from C0 to C0+C1 when a phone card is inserted that has had connection wires to a simulator fitted thereto.

Detection by means of an ECD suffers from the drawback of the parasitic capacitance C1 drifting as a function of temperature and humidity. Therefore, in order to obtain best performance in terms of the number of wires that can be detected, it is necessary to provide automatic correction in hardware, or semiautomatic correction in software. It is then advantageous to make use of a differential circuit for canceling the effects of such drift in the parasitic capacitance.

OBJECTS AND SUMMARY OF THE INVENTION

One object of the present invention is to provide an improved technique for detecting fraud in use of a phone card.

A more specific object of the present invention is to detect fraud in use of a phone card which is conducted with an active phone card simulator without having to provide a correction for drifting of a parasitic capacitance.

This and other objects are attained in accordance with one aspect of the present invention directed to detecting the fraud that involves using an asynchronous circuit in the place of a card having an electronic circuit that is synchronous, presenting a given power-up time. A given excitation signal is applied to the electronic circuit of the card upon power-up, a response pattern outputted by the circuit is recorded, the response pattern is compared with a reference pattern corresponding to the response expected from the electronic circuit to such excitation signal, and the fraudulent use is identified by means of an asynchronous circuit when the comparison is negative.

As explained in greater detail below, the invention makes it possible to detect the fraudulent presence of an active phone card simulator by making use of the fact that an asynchronous electronic circuit can simulate a phone card only after a certain amount of time has elapsed after the circuit has been powered. This minimum length of time is never shorter than 10 ms. When a card, whether an authentic card or an active type fraudulent card, is inserted into the reader of a pay phone for example, a power supply voltage is delivered to the card by the reader. It will thus be understood that if a given excitation signal is applied to the input of the circuit of the card present in the reader after a length of time that is equal to or slightly greater than the power-up time required to enable a synchronous circuit to operate, then the response pattern supplied by the circuit will be the expected reference pattern if the card is authentic, whereas if the card is a fraudulent card having an asynchronous circuit, then the response pattern will be completely erratic since the circuit is not yet ready to operate, thus enabling fraud to be diagnosed.

DETAILED DESCRIPTION OF THE PREFERRED EMBODIMENT

Figure 1:
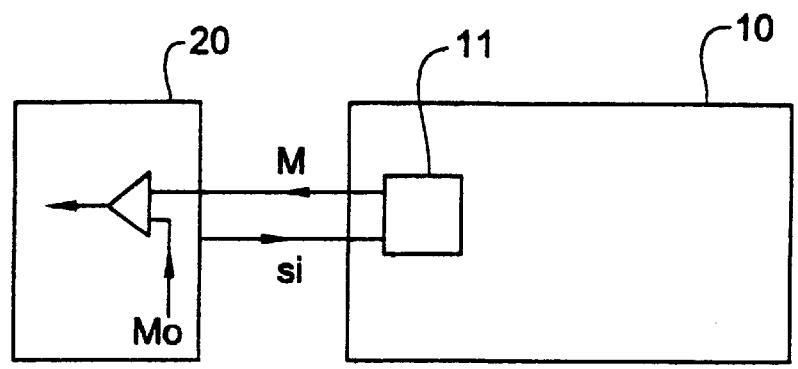
FIG. 1 is a diagram of a fraud detection device for detecting an active simulator of an electronic circuit card.

FIG. 1 shows a card 10 for use in a telephone, e.g. a pay phone, by being inserted into a reader 20. When the card 10 is inserted into the reader 20, the electric contacts of the electronic circuit 11 of the card are put into communication with a connector (not shown) of the reader so that, firstly, the electronic circuit 11 is powered by the reader and, secondly, information is exchanged between the reader and such circuit.

The card 10 may be authentic or it may be fraudulent.

Figure 2A:
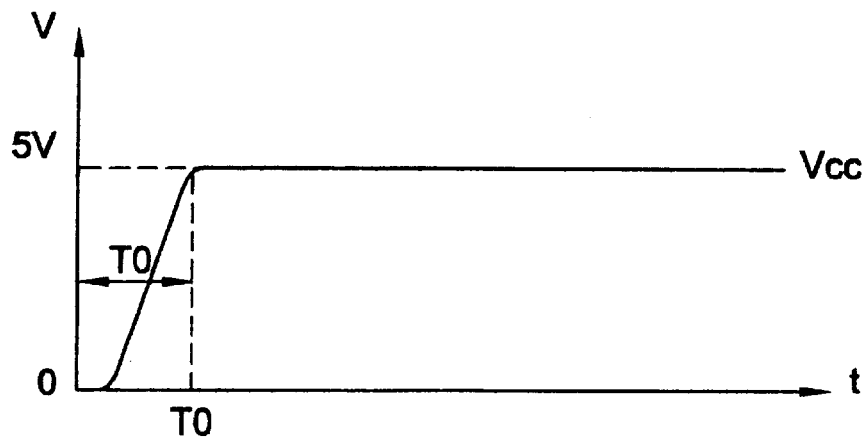
FIG. 2a is a timing diagram showing the powering-up of a synchronous circuit.

When the card is authentic, then it is a phone card having a simple electronic memory which behaves like a synchronous circuit having wired logic. As shown in FIG. 2a, upon being powered up, a synchronous circuit is ready to operate after a delay which depends only on the power supply rise time T0 and on when the threshold levels at which logic levels can be distinguished (low level, or level 0, and high level, or level 1) are exceeded. This power-up time T0 is generally about 500 ns.

Figure 2B:
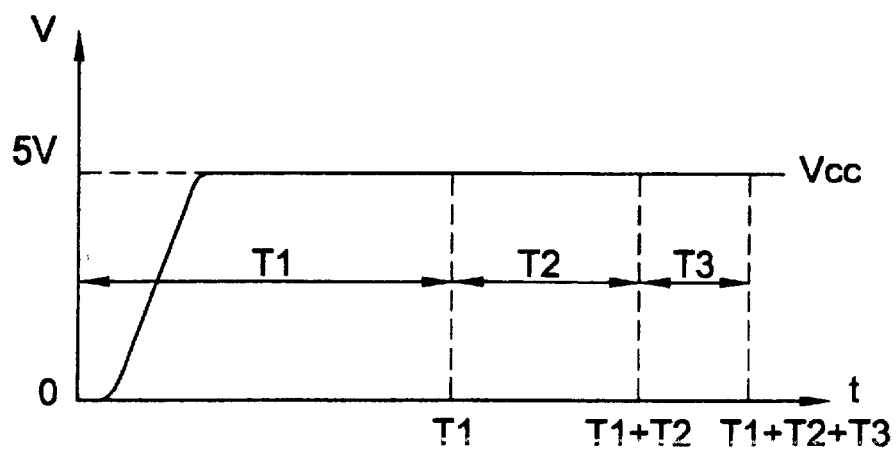
FIG. 2b is a timing diagram showing the powering-up of an asynchronous circuit.

With a fraudulent card, the card includes a programmed logic simulator comprising an asynchronous circuit, in particular a microcontroller associated with ROM or RAM type memories. The power-up time shown in FIG. 2b depends on several factors:

(1) A "reset" time which characterizes the shortest wait necessary for stabilizing the local oscillator so as to obtain a regular clock (time T1) and to initialize the internal logic of the circuit (registers, program counters, etc.) (time T2). The total "reset" time T1+T2 is about 10 ms.

(2) Execution of the "initialization" portion of the program simulating the synchronous circuit of an authentic card (definition of variables, stack addressing, register addressing, etc.). This time T3 is equal to the number of required execute one instruction (about $1\mu s$). For initialization by 30 instructions, for example, the time T3 is about $30\mu s$.

It will be observed that the total power-up time T1+T2+T3 is not less than 10 ms, which is significantly longer than the 500 ns time T0 for a synchronous circuit.

Thus, the invention detects fraud by applying an excitation signal si from reader 20 to an input of the electronic circuit 11 of the card 10 after a time of at least 500 ns, but less than 10 ms, after power is applied to the card. The pattern M generated in response to the excitation signal si on the I/O (input/output) pin of the circuit 11 is recorded. The response pattern M is then compared with a reference pattern M0 stored in the memory of the reader 20 and corresponding to the response expected from the electronic circuit to the excitation signal si. In the preferred embodiment, excitation signal si is a step transition from one voltage to another. The response pattern M is the manufacturer code, the serial number of the card, an authentication pattern, and the initial value of the credit units of the card.

If the response pattern M is identical to the expected pattern M0, then it is concluded that no active simulator is present, since otherwise the response would have been different because the asynchronous circuit of the fraudulent card would not have had sufficient time to become operational.

In summary, the determination of a negative comparison between the patterns M and M0 makes it possible to conclude that fraud is being attempted by means of an active simulator.

Although a preferred embodiment of the present invention has been described in detail above, various modifications thereto will be readily apparent to anyone with ordinary skill in the art. All such modifications are intended to fall within the scope of the present invention as defined by the following claims.

I claim:

1. A method of detecting fraud involving use of an asynchronous circuit in the place of a card having an electronic circuit that is a synchronous circuit, the asynchronous circuit having a power-up time that is longer than a power-up time of the synchronous circuit, the method comprising the steps of:

initiating power-up of the electronic circuit on the card, applying a given excitation signal to the electronic circuit of the card after the power-up time of the synchronous circuit has elapsed, recording a response pattern generated by the electronic circuit before the power-up time of the asynchronous circuit has elapsed, comparing said response pattern with a reference pattern corresponding to the response expected from the electronic circuit to said excitation signal if such electronic circuit is a synchronous circuit, and identifying a fraudulent use by means of an asynchronous circuit when the comparison is negative.

2. An apparatus for detecting fraud involving use of an asynchronous circuit in the place of a card having an electronic circuit that is a synchronous circuit, the asynchronous circuit having a power-up time that is longer than a power-up time of the synchronous circuit, the apparatus comprising:

means for initiating power-up of the electronic circuit on the card, means for applying a given excitation signal to the electronic circuit of the card after the power-up time of the synchronous circuit has elapsed, means for recording a response pattern generated by the electronic circuit before the power-up time of the asynchronous circuit has elapsed, means for comparing said response pattern with a reference pattern corresponding to the response expected from the electronic circuit to said excitation signal if such electronic circuit is a synchronous circuit, and means for identifying a fraudulent use by means of an asynchronous circuit when the comparison is negative.

\* \* \* \* \*